United States Patent
Tsunoya et al.

(10) Patent No.: US 10,696,023 B2
(45) Date of Patent: Jun. 30, 2020

(54) THREE-DIMENSIONAL MODELING APPARATUS, PRODUCTION METHOD, AND COMPUTER PROGRAM

(71) Applicant: Seiko Epson Corporation, Tokyo (JP)

(72) Inventors: Akihiko Tsunoya, Okaya (JP); Masaya Ishida, Hara-mura (JP); Eiji Okamoto, Matsumoto (JP)

(73) Assignee: Seiko Epson Corporation (JP)

( * ) Notice: Subject to any disclaimer, the term of this patent is extended or adjusted under 35 U.S.C. 154(b) by 220 days.

(21) Appl. No.: 15/696,561

(22) Filed: Sep. 6, 2017

(65) Prior Publication Data

US 2018/0079183 A1    Mar. 22, 2018

(30) Foreign Application Priority Data

Sep. 21, 2016 (JP) ................................. 2016-184082

(51) Int. Cl.

| | |
|---|---|
| *B32B 27/06* | (2006.01) |
| *B33Y 30/00* | (2015.01) |
| *B33Y 10/00* | (2015.01) |
| *B29C 64/112* | (2017.01) |
| *B29C 64/393* | (2017.01) |
| *B33Y 50/02* | (2015.01) |
| *B32B 37/14* | (2006.01) |
| *B32B 41/00* | (2006.01) |

(52) U.S. Cl.
CPC .......... *B32B 27/06* (2013.01); *B29C 64/112* (2017.08); *B29C 64/393* (2017.08); *B32B 37/14* (2013.01); *B32B 41/00* (2013.01); *B33Y 10/00* (2014.12); *B33Y 30/00* (2014.12); *B33Y 50/02* (2014.12); *Y02P 10/295* (2015.11)

(58) Field of Classification Search
CPC .......... B32B 27/06; B32B 37/14; B32B 41/00
See application file for complete search history.

(56) References Cited

U.S. PATENT DOCUMENTS

2015/0210011 A1* 7/2015 Conrow ................ B29C 64/386
264/40.4

FOREIGN PATENT DOCUMENTS

| JP | 2012-030530 A | 2/2012 |
|---|---|---|
| JP | 2015-081380 A | 4/2015 |
| JP | 2016-022641 A | 2/2016 |

* cited by examiner

*Primary Examiner* — Daniel McNally
(74) *Attorney, Agent, or Firm* — Harness, Dickey & Pierce, P.L.C.

(57) ABSTRACT

A three-dimensional modeling apparatus includes an ejection portion capable of ejecting a fluid material, and a control portion that forms a laminated body in which one layer or more of cross-section bodies are laminated by executing one or more repetitions of a cross-section body formation process. The control portion reduces a total amount of the fluid material to be ejected at a first coordinate, which configures the apex that corresponds to the recess, to be lower than a total amount of the fluid material to be ejected at a second coordinate, which configures a region other than an outline section of the planar shape in a case in which an apex, which corresponds to a recess in a planar shape when the laminated body is viewed from above in a planar manner, is present.

4 Claims, 11 Drawing Sheets

THREE-DIMENSIONAL MODELING APPARATUS, PRODUCTION METHOD, AND COMPUTER PROGRAM

BACKGROUND

1. Technical Field

The present invention relates to a three-dimensional modeling apparatus, a production method, and a computer program.

2. Related Art

In recent years, three-dimensional modeling apparatuses for modeling a three-dimensional object have attracted attention. Generally, in a three-dimensional modeling apparatus, modeling of a three-dimensional object is performed by forming and repeatedly laminating two-dimensional cross-section bodies (for example, refer to JP-A-2015-81380).

However, for example, when an object is modeled by ejecting a fluid material in liquid droplet form, in a case in which apexes, which correspond to recesses in a planar shape when the object is viewed from above in a planar manner, are present, there is a tendency for an amount of the fluid material that flows into dots that configure the apexes from dots in the periphery to be greater than an amount of the fluid material that flows into dots that configure other outline sections from the periphery thereof. Considering this, there are cases in which an outline of the object is not formed in a clean manner as a result of the material wet-spreading toward spaces on an outer side of the object from the apexes, which are recesses. Accordingly, in three-dimensional modeling apparatuses, there is a demand for a technique capable of forming an outline of an object in a clean manner.

SUMMARY

The invention can be realized in the following aspects.

(1) According to an aspect of the invention, there is provided a three-dimensional modeling apparatus that models a three-dimensional object. The three-dimensional modeling apparatus includes an ejection portion capable of ejecting a fluid material, which is a material of the object, and a control portion that forms a laminated body in which one layer or more of cross-section bodies are laminated by executing one or more repetitions of a cross-section body formation process, which forms a cross-section body equivalent to one layer of the object by controlling the ejection portion and ejecting the fluid material, in which the control portion reduces a total amount of the fluid material to be ejected at a first coordinate, which configures the apex that corresponds to the recess, to be lower than a total amount of the fluid material to be ejected at a second coordinate, which configures a region other than an outline section of the planar shape in a case in which an apex, which corresponds to a recess in a planar shape when the laminated body is viewed from above in a planar manner, is present. In a three-dimensional modeling apparatus according to the aspect, it is possible to suppress wet-spreading of the fluid material into a space from an apex section, which corresponds to a recess in a planar shape when the object is viewed from above in a planar manner. Therefore, it is possible to form an outline of an object in a clean manner.

(2) The above-mentioned three-dimensional modeling apparatus in which the control portion reduces the total amount of the fluid material to be ejected at the first coordinate by reducing the fluid material to be ejected at the first coordinate of any one or more cross-section bodies among cross-section bodies that configure the laminated body. In a three-dimensional modeling apparatus according to the aspect, it is possible to form an outline of an object in a clean manner by using a simple process.

(3) The above-mentioned three-dimensional modeling apparatus in which the control portion executes a correction process that ejects the fluid material onto a target correction location, which is at least a portion of an outline section of an upper surface of the laminated body, and in the correction process, the control portion reduces the total amount of the fluid material to be ejected at the first coordinate by reducing the fluid material to be ejected at a coordinate corresponding to the first coordinate of the target correction location. In a three-dimensional modeling apparatus according to the aspect, it is possible to form an outline of an object in a clean manner.

(4) The above-mentioned three-dimensional modeling apparatus further including a pedestal for laminating the cross-section body, in which a position corresponding to the first coordinate of the pedestal is formed to be lower than other coordinates. In a three-dimensional modeling apparatus according to the aspect, it is also possible to reduce the total amount of the fluid material to be ejected at the first coordinate of the object.

The invention can also be realized in various aspects in addition to an aspect as a three-dimensional modeling apparatus. For example, the invention can be realized as a production method according to which a three-dimensional modeling apparatus produces a three-dimensional object, a computer program for modeling a three-dimensional object as a result of a computer controlling a three-dimensional modeling apparatus, a non-transitory, tangible recording medium on which the computer program is recorded, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
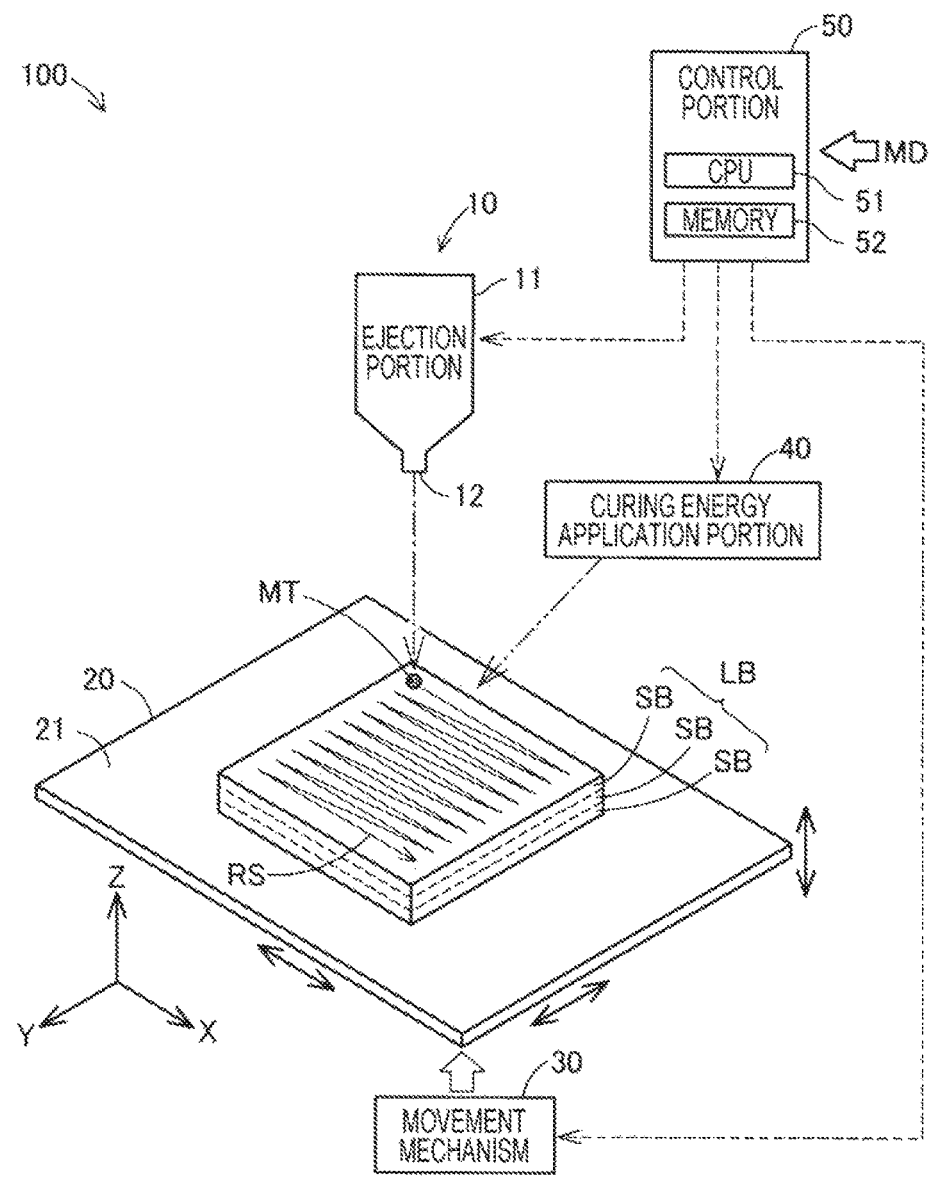
FIG. 1 is a schematic diagram that shows a configuration of a three-dimensional modeling apparatus in a first embodiment.

FIG. 1 is a schematic diagram that shows a configuration of a three-dimensional modeling apparatus 100 in a first embodiment. The three-dimensional modeling apparatus 100 of the present embodiment is provided with an ejection portion 10 and a control portion 50. In addition, the three-dimensional modeling apparatus 100 of the present embodiment is provided with a modeling stage 20, a movement mechanism 30, and a curing energy application portion 40. The three-dimensional modeling apparatus 100 models a three-dimensional object by forming a cross-section body SB following an XY plane by ejecting a fluid material MT from the ejection portion 10 and stacking the cross-section body SB in a layered form in a +Z direction. Each cross-section body SB is formed by arranging the fluid material MT in dot form, at a coordinate determined in advance in accordance with a modeling resolution. A specific example of the fluid material MT will be mentioned later.

The ejection portion 10 is a device capable of ejecting the liquid droplet form fluid material MT in a stipulated position on the modeling stage 20. The ejection portion 10 in the present embodiment is configured by a dispenser. The ejection portion 10 is provided with a main body portion 11 configured by a metal hollow container. A nozzle 12, which is in communication with an interior space of the main body portion 11, is provided in the main body portion 11 of the ejection portion 10. The nozzle 12 is open toward the modeling stage 20. For example, the opening diameter of the nozzle 12 is approximately 5 to 300 The ejection portion 10 ejects the fluid material MT, which is delivered under pressure and supplied to the main body portion 11 from a material supply source (omitted from the drawings), from the nozzle 12 in a liquid droplet form as a result of a reciprocating motion of a piston provided in an inner portion of the main body portion 11. In the present embodiment, the ejection portion 10 discharges a liquid droplet of the fluid material MT toward the modeling stage 20, which is therebelow, from an upper side in the gravity direction (+Z direction side). The ejection portion 10 discharges an amount of the fluid material MT equivalent to one dot for each repetition of discharge. For example, The amount of the fluid material MT equivalent to one dot is 2 nanolitres. Additionally, the ejection portion 10 is not limited to a dispenser, and may also be configured by another ejection device such as an ink jet head.

The modeling stage 20 is a pedestal for modeling a three-dimensional object, which is a modeling target. The modeling stage 20 has a surface 21 on which the cross-section body SB is formed. In the present embodiment, the surface 21 is disposed in a flat manner. An X direction and a Y direction shown in FIG. 1 respectively coincide with the directions of coordinate axes of coordinates at which the ejection portion 10 deposits the fluid material MT on the surface 21 of the modeling stage 20.

The movement mechanism 30 relatively moves the modeling stage 20 in the X, Y, and Z directions relative to the nozzle 12 of the ejection portion 10. The movement mechanism 30 is provided with a motor that generates a driving force, and various actuators (respectively omitted from the drawings) such as a roller, a belt, that move the modeling stage 20 in the X direction and the Y direction, and a lift that moves the modeling stage 20 in the Z direction. In the present embodiment, a depositing position of the fluid material MT on the surface 21 of the modeling stage 20 is controlled as a result of movement of the modeling stage 20 relative to the ejection portion 10. Additionally, in another embodiment, a configuration in which the modeling stage 20 is fixed and the ejection portion 10 moves relative to the modeling stage 20 due to a movement mechanism may also be used.

The curing energy application portion 40 cures liquid droplets of the fluid material MT deposited on the modeling stage 20 by applying an energy thereto. In the present embodiment, the curing energy application portion 40 is configured by a laser device, and applies light energy to the fluid material MT as a result of radiating a laser. The curing energy application portion 40 includes a laser light source, a condensing lens for condensing a laser emitted from the laser light source onto the fluid material MT deposited on the modeling stage 20, and a galvanometer mirror for scanning the laser (respectively omitted from the drawings). The curing energy application portion 40 scans a depositing position of the fluid material MT by using the laser, heats the fluid material MT by using the light energy of the laser, and sinters a material powder included in the fluid material MT. In the present embodiment, the curing energy application portion 40 performs curing of the fluid material MT for each cross-section body SB equivalent to one layer and each time a correction layer, which will be mentioned later, is formed. Additionally, the curing energy application portion 40 is not limited to a laser device, and may also be configured by another device such as an ultraviolet ray irradiation device in accordance with the properties of the fluid material MT. In addition, the fluid material MT may be cured more than at a point of discharge by reducing the fluidity of the fluid material MT as a result of removing at least a portion of a solvent included in the fluid material MT by applying thermal energy to liquid droplets of the fluid material MT deposited on the modeling stage 20.

The control portion 50 is configured by computer provided with a CPU 51 and a memory 52. The CPU 51 realizes a function of performing a three-dimensional modeling process, which will be mentioned later, by controlling the ejection portion 10, the movement mechanism 30, and the curing energy application portion 40 as a result of reading and executing a computer program stored in the memory 52. For example, the computer program may be recorded on various recording media such as a hard disk, a flash memory, a DVD-ROM, or the like.

The control portion 50 acquires model data MD for modeling a three-dimensional object from an external computer connected to the three-dimensional modeling apparatus 100, a recording medium, or the like. In the present embodiment, data that represents the disposition of the fluid material MT of cross-section body SB to be stacked in a height direction of the three-dimensional object is included in the model data MD. The control portion 50 determines process conditions such as the timing at which the ejection portion 10 is caused to discharge the fluid material MT, the depositing position of the liquid droplets on the modeling stage 20, the curing timing of the fluid material MT by the curing energy application portion 40, and the like, on the basis of the model data MD.

Next, a specific example of the fluid material MT used in the present embodiment will be described. In the present embodiment, the fluid material MT is a paste form fluid composition that includes a powder material and a solvent.

For example, an elementary powder of magnesium (Mg), iron (Fe), cobalt (Co), chromium (Cr), aluminum (Al), titanium (Ti), copper (Cu), nickel (Ni), or an alloy powder (a maraging steel, stainless steel, a cobalt chromium molybdenum, a titanium alloy, a nickel alloy, an aluminum alloy, a cobalt alloy, or a cobalt chromium alloy) including one or more of the above-mentioned metals, or a mixed powder in which one or more selected from the above-mentioned elementary powders and alloy powders are combined may be used as the powder material. For example, the solvent of the fluid material MT may be water, a (poly)alkylene glycol monoalkyl ether such as ethylene glycol monomethyl ether, ethylene glycol monoethyl ether, propylene glycol monomethyl ether, or propylene glycol monoethyl ether, an acetate ester such as ethyl acetate, n-propyl acetate, isopropyl acetate, n-butyl acetate, or isobutyl acetate, an aromatic hydrocarbon such as benzene, toluene, or xylene, a ketone such as methyl ethyl ketone, acetone, methyl isobutyl ketone, ethyl n-butyl ketone, diisopropyl ketone, or acetylacetone, an alcohol such as ethanol, propanol, or butanol, a tetraalkyl ammonium acetate, a sulfoxide solvent such as dimethyl sulfoxide or diethyl sulfoxide, a pyridine solvent such as pridine, γ-picoline, or 2,6-lutidine, an ionic liquid such as tetraalkyl ammonium acetate (for example, tetrabutyl ammonium acetate), or a substance in which one or more of the above are combined.

The fluid material MT may be a mixed material configured in a slurry form or a paste form by mixing a binder with the powder material and the solvent. For example, the binder may be an acrylic resin, an epoxy resin, a silicone resin, a cellulose resin, or another synthetic resin, or a PLA (polylactic acid), a PA (polyamide), a PPS (polyphenylene sulfide), or another thermoplastic resin. The fluid material MT is not limited to a substance that includes the above-mentioned powder material, and for example, may be a substance in which a resin such as a general-purpose engineering plastic, such as a polyamide, a polyacetal, a polycarbonate, a modified polyphenylene ether, a polybutylene terephthalate, or a polyethylene terephthalate, is melted. In addition, the fluid material MT may be a resin such as an engineering plastic, such as a polysulfone, a polyethersulfone, a polyphenylene sulfide, a polyarylate, polyimide, a polyamide-imide, a polyetherimide, or a polyether ether ketone. In this manner, it is possible to adopt a metal other than the above-mentioned metals, a ceramic, a resin, or the like, as the fluid material MT. A sintering aid may be included in the fluid material MT.

Figure 2:
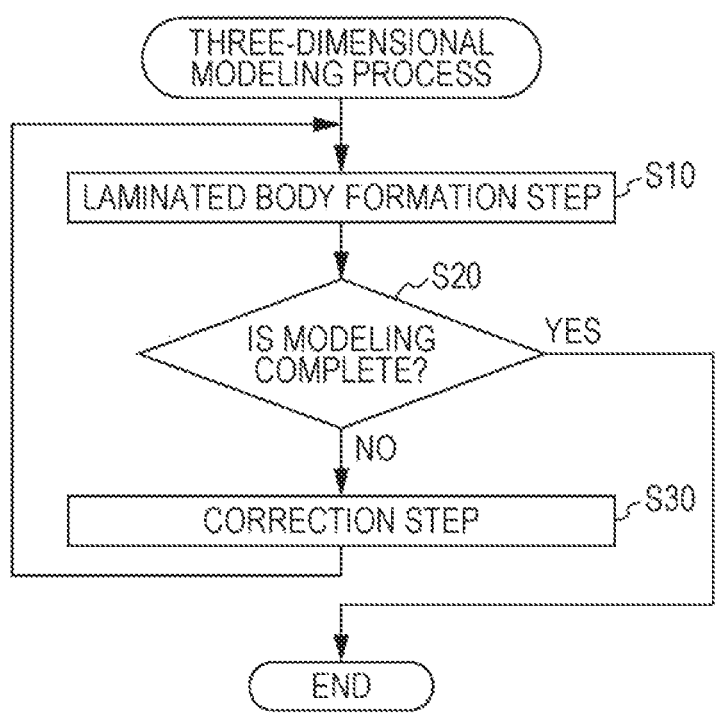
FIG. 2 is a flowchart of a three-dimensional modeling process.

FIG. 2 is a flowchart of a three-dimensional modeling process executed by the control portion 50. The flowchart shows a production method of a three-dimensional object by the three-dimensional modeling apparatus 100. When the three-dimensional modeling process is started, firstly, the control portion 50 performs a laminated body formation step (Step S10). In the laminated body formation step, firstly, the control portion 50 performs a process that forms a cross-section body SB equivalent to one layer of the object by ejecting the fluid material MT as a result of controlling the ejection portion 10 in accordance with the model data MD acquired from an external computer, or the like. Hereinafter, this process will be referred to as a "cross-section body formation process". In the present embodiment, as shown by the arrow RS in FIG. 1, the control portion 50 performs the cross-section body formation process by using a so-called raster scan technique that performs ejection of material while moving the ejection portion 10 in the X direction, moves the ejection portion 10 by an amount equivalent to one dot in the Y direction after ejection of liquid droplets in the X direction equivalent to one row is complete, and performs ejection of liquid droplets for the next row.

Figure 3:
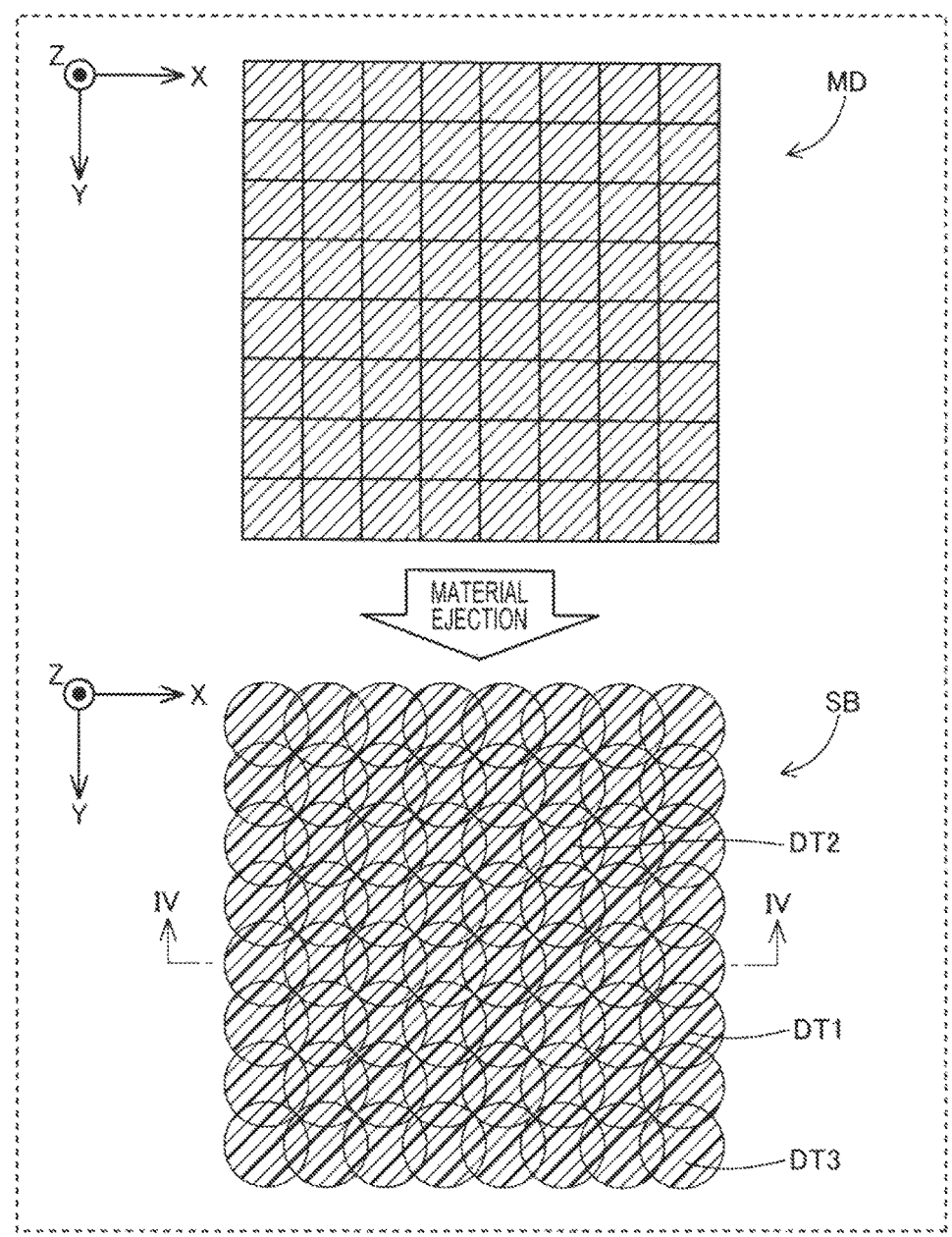
FIG. 3 is an explanatory view of a cross-section body formation process.

FIG. 3 is an explanatory view of the cross-section body formation process. Model data MD of a cross-section body SB is shown in the upper portion of FIG. 3. Each lattice represents each coordinate of the cross-section body SB. The planar shape of the cross-section body SB to be formed by the model data MD is shown in the lower portion of FIG. 3. When the fluid material MT ejected from the ejection portion 10 is deposited in a coordinate stipulated by the model data MD, wet-spreading to peripheral coordinates also occurs. Therefore, the material deposited in each coordinate forms the cross-section body SB while respectively overlapping with material of peripheral coordinates. For example, the diameter of a dot formed in each coordinate is 300 μm per one dot.

In the laminated body formation step of Step S10, the control portion 50 forms a laminated body LB (refer to FIG. 1), in which one layer or more of the cross-section body SB is laminated, by executing one or more repetitions of the cross-section body formation process. In this instance, the term "laminating one or more layers of the cross-section body SB" does not refer to laminating cross-section bodies SB of the same shape, but refers to forming a predetermined number of layers of the cross-section body SB in accordance with the model data MD without performing a correction step, which will be mentioned later. In the present embodiment, the laminated body LB is formed by continuously laminating three cross-section bodies SB without interposing the correction step, which will be mentioned later, therebetween. For example, the number of cross-section bodies SB laminated in the laminated body formation step is 2 to 10. This number can be determined by performing a pre-experiment or a simulation in order for the outline of the object to be clean as a result the correction process, which will be mentioned later.

Figure 4:
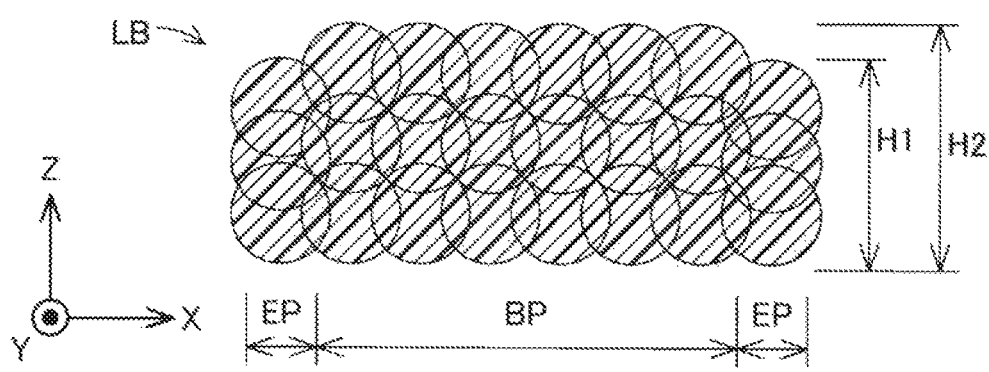
FIG. 4 is a cross-sectional view of a laminated body.

FIG. 4 is a cross-sectional view of a laminated body LB in which three cross-section bodies SB are laminated. The cross-sectional view shows a cross-section taken along a line IV-IV of FIG. 3. As shown in FIG. 4, when a plurality of the cross-section bodies SB are laminated, a height H1 of an outline section EP of the object is less than a height H2 of a body portion BP further on the inner side than the outline section EP. The reason for this is that, as shown in the lower portion of FIG. 3, for example, whereas there are five dots adjacent to the periphery of a dot DT1, which is positioned in an outline section of the cross-section body SB, there are eight dots adjacent to the periphery of a dot DT2, which is positioned in a body section further on the inner side than the outline section, and therefore, an amount of the material that flows in from peripheral coordinates is less in the outline section than in the body section and this appears as a difference in height. The difference in height between the outline section and the body section of an object corresponds to a cause of the occurrence of roundness of the outline section on the upper surface of the object.

After the laminated body formation step, the control portion 50 determines whether or not modeling is complete for all cross-section bodies included in the model data MD (Step S20). The control portion 50 finishes the three-dimensional modeling process if modeling is complete (Step S20: YES), and performs the correction step (Step S30) if modeling is not complete (Step S20: NO). The correction step is a step for forming the outline section of a three-dimensional object in a clean manner. In the correction step of the present embodiment, the control portion 50 executes a process that ejects the fluid material MT onto a target correction location, which is at least a portion of the outline section on the upper surface of the laminated body LB. Hereinafter, this process will be referred to as a "correction process". The target correction location in the present embodiment is the entire outline on the upper surface of the laminated body LB.

Figure 5:
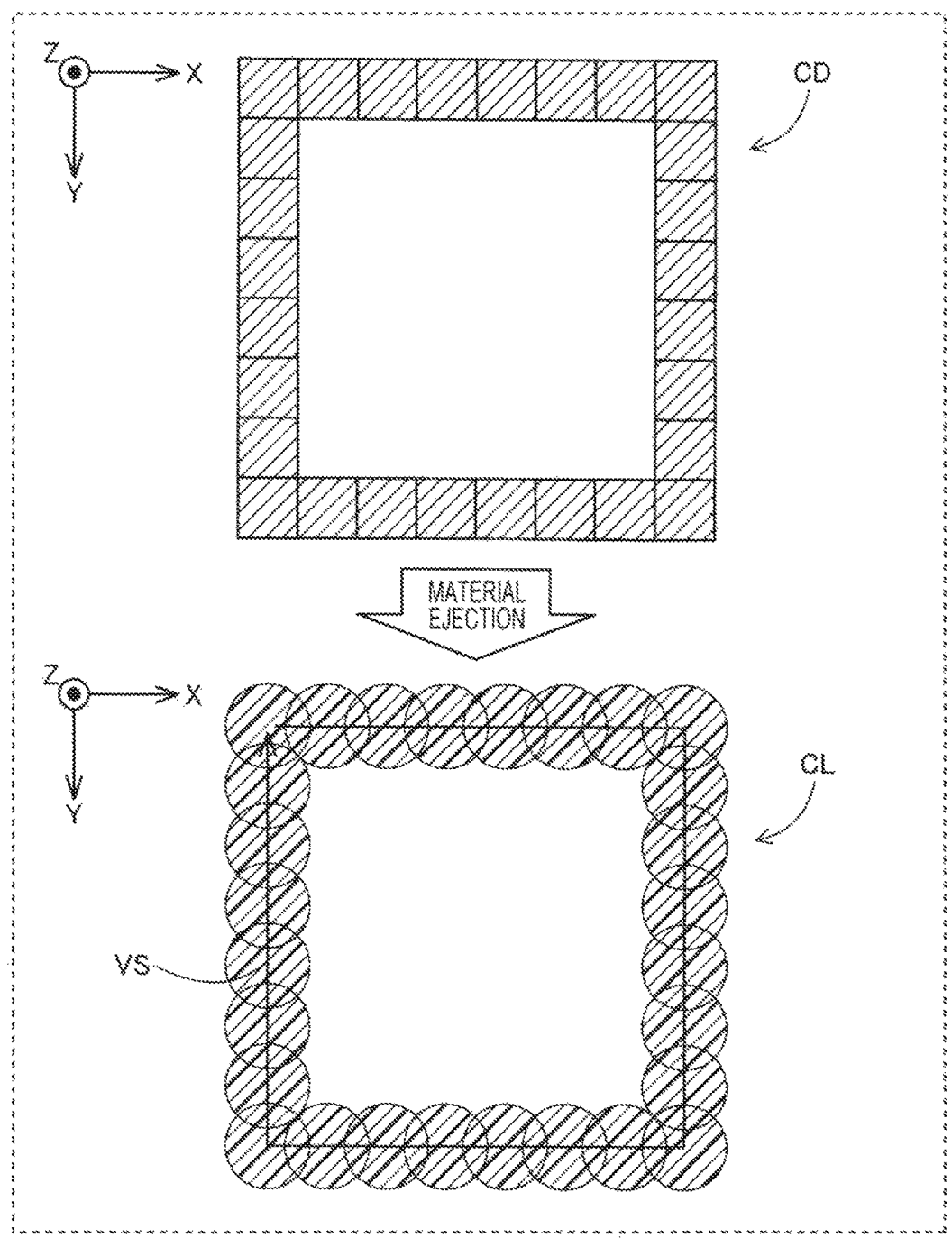
FIG. 5 is an explanatory view of a correction process.

FIG. 5 is an explanatory view of the correction process. Correction data CD used in the correction process is shown in the upper portion of FIG. 5. The correction data CD represents a shape that follows the outline section on the upper surface of the laminated body LB, which is formed in the immediately preceding laminated body formation step. In the present embodiment, the control portion 50 automatically generates the correction data CD on the basis of the model data MD. More specifically, the outline section of the model data MD, which represents the shape of an uppermost cross-section body SB of the laminated body LB to be formed in the laminated body formation step, is extracted, and data that represents the shape of the outline section is set as the correction data CD. Additionally, in other embodiments, the correction data CD may also be included in advance in the model data MD together with data that represents the cross-section bodies SB.

The planar shape of dots to be formed by the correction data CD is shown in the lower portion of FIG. 5. In the present embodiment, a layer to be formed by the correction data CD will be referred to as a correction layer CL. In the above-mentioned manner, in the present embodiment, whereas formation of a dot is performed by using a raster scan technique for the cross-section body SB, as shown by the arrow VS in FIG. 5, the formation of a dot is performed by using a vector scan technique, which continuously ejects the fluid material MT along a shape of the target correction location, for the correction layer CL. As a result of this, it is possible to perform the correction process at high speed. Additionally, in other embodiments, the correction layer CL may be formed by using a raster scan technique. In addition, both the cross-section bodies SB and the correction layer CL may be formed by using a vector scan technique.

Figure 6:
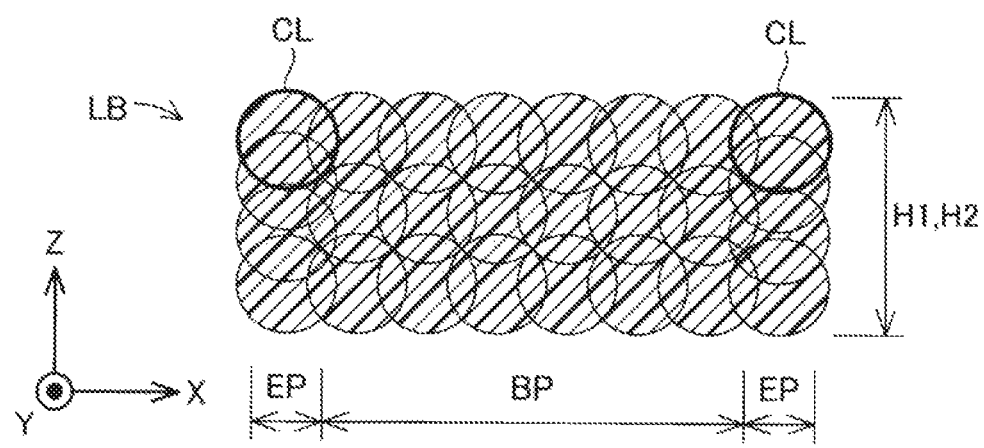
FIG. 6 is a cross-sectional view of a laminated body after the correction process.

FIG. 6 is a cross-sectional view of the laminated body LB after the correction process. As shown in FIG. 6, when the correction process is performed, since the correction layer CL equivalent to one layer additionally formed in the outline section EP of the object, it is possible to align the height H1 of the outline section EP and the height H2 of the body portion BP.

According to the three-dimensional modeling apparatus 100 of the present embodiment, which is described above, since the correction layer CL is formed by ejecting the fluid material MT onto at least a portion of the outline section EP on the upper surface of the laminated body LB, it is possible to suppress a circumstance in which the outline section EP of the laminated body LB is low. Therefore, it is possible to suppress a circumstance in which the outline of the object, and in particular, the outline of the uppermost surface of the object becomes rounded, and therefore, it is possible to form the outline in a clean manner.

In addition, in the present embodiment, as shown in FIG. 2, since the three-dimensional modeling process finishes after the laminated body formation step and does not finish immediately after the correction step, it is possible to suppress a circumstance in which a track of the correction remains on the outward appearance of the object.

Figure 7:
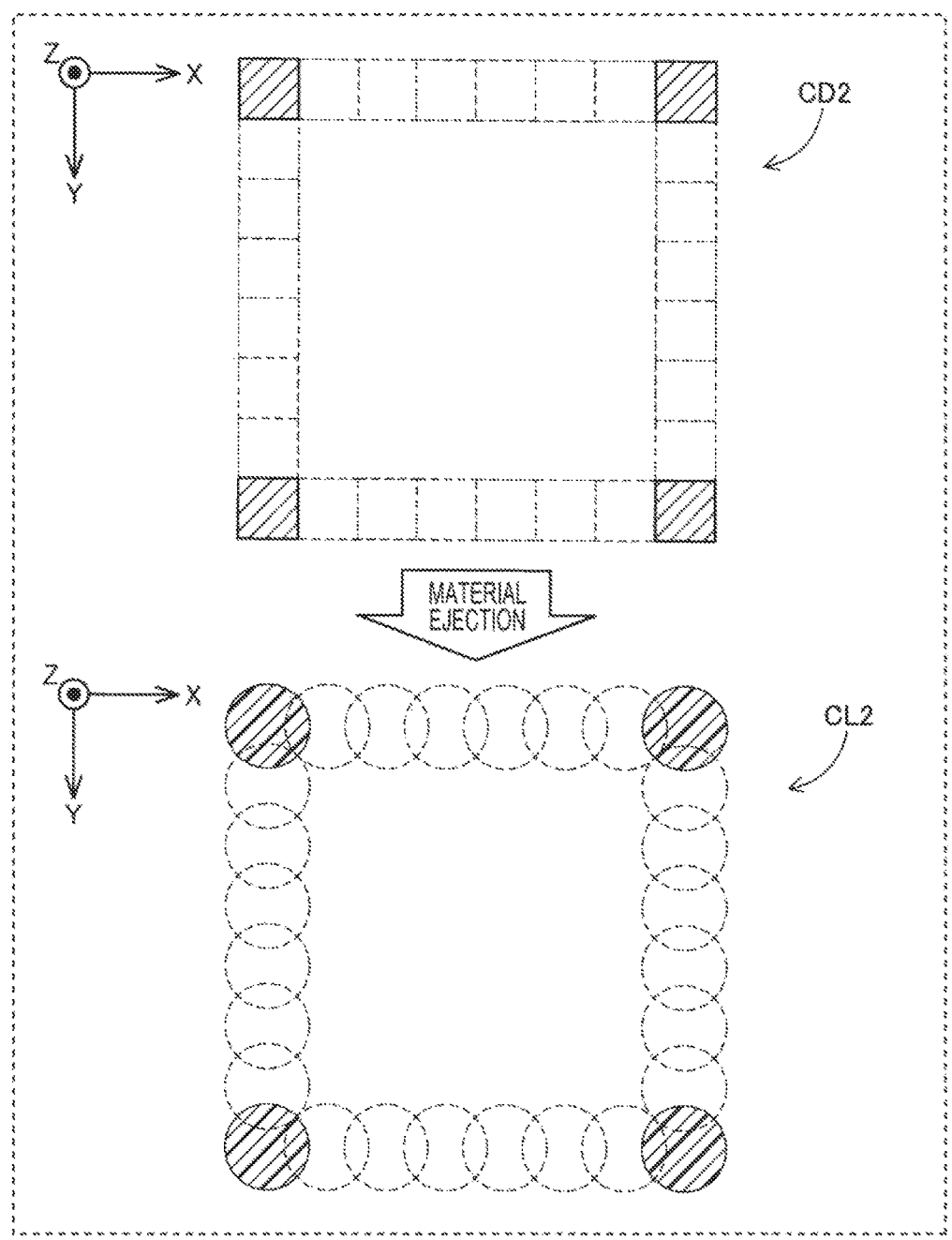
FIG. 7 is an explanatory view that shows another embodiment of the correction process.

FIG. 7 is an explanatory view that shows another embodiment of the correction process. The correction data used in the above-mentioned correction process is not limited to the correction data CD having the shape shown in FIG. 5. FIG. 7 shows an example of another item of correction data CD2.

Hereinafter, the correction data CD shown in FIG. 5 will be referred to as first correction data CD, and the correction data shown in FIG. 7 will be referred to as second correction data CD2. The second correction data CD2 shown in the upper portion of FIG. 7 represents a shape in which, among the outline section on the upper surface of the laminated body LB formed in the laminated body formation step, only apex sections, which correspond to protrusions, have been extracted. The shape of a correction layer CL2 to be formed by the second correction data CD2 is shown in the lower portion of FIG. 7.

As shown in FIG. 3, in the outline section of the cross-section body SB, although the dots are present in the same outline, the number of dots adjacent to the periphery of the dot DT1 that configures an edge of the outline is different from that of a dot DT3 that configures an apex, which corresponds to a protrusion. More specifically, whereas there are five dots adjacent to the dot DT1 that configures an edge of the outline, there are three dots adjacent to the dot DT3 that configures an apex, which corresponds to a protrusion. Therefore, the height of apexes, which correspond to protrusions of the cross-section bodies SB, can be formed to be less than that of other outline sections. Accordingly, if the correction process is performed on the basis of the second correction data CD2 shown in FIG. 7 in addition to the first correction data CD shown in FIG. 5, it is possible to form apex sections, which correspond to protrusions of the outline on the uppermost surface of the object, in a clean manner. Additionally, in the present embodiment, the term "apex" refers to an intersection of an edge configured by two or more dots being aligned in the X direction and an edge configured by two or more dots being aligned in the Y direction.

Various timings can be adopted as the timing of the correction process due to the second correction data CD2. For example, the correction process due to the second correction data CD2 may be performed immediately before or immediately after the timing for performing the correction process due to the first correction data CD. In addition, the correction process due to the first correction data CD and the correction process due to the second correction data CD2 may be alternately performed each time the correction step is performed in Step S30. In addition, the correction process due to the first correction data CD may be omitted and only the correction process due to the second correction data CD2 may be performed.

The control portion 50 can automatically generate the second correction data CD2 on the basis of the model data MD. More specifically, among the outline section of the model data MD, which represents the shape of an uppermost cross-section body SB of the laminated body LB to be formed in the laminated body formation step, apex sections which correspond to protrusions are extracted, and data that represents the shape of the apex section is set as the second correction data CD2. Additionally, in other embodiments, the second correction data CD2 may also be included in advance in the model data MD together with data that represents the cross-section bodies SB.

Figure 8:
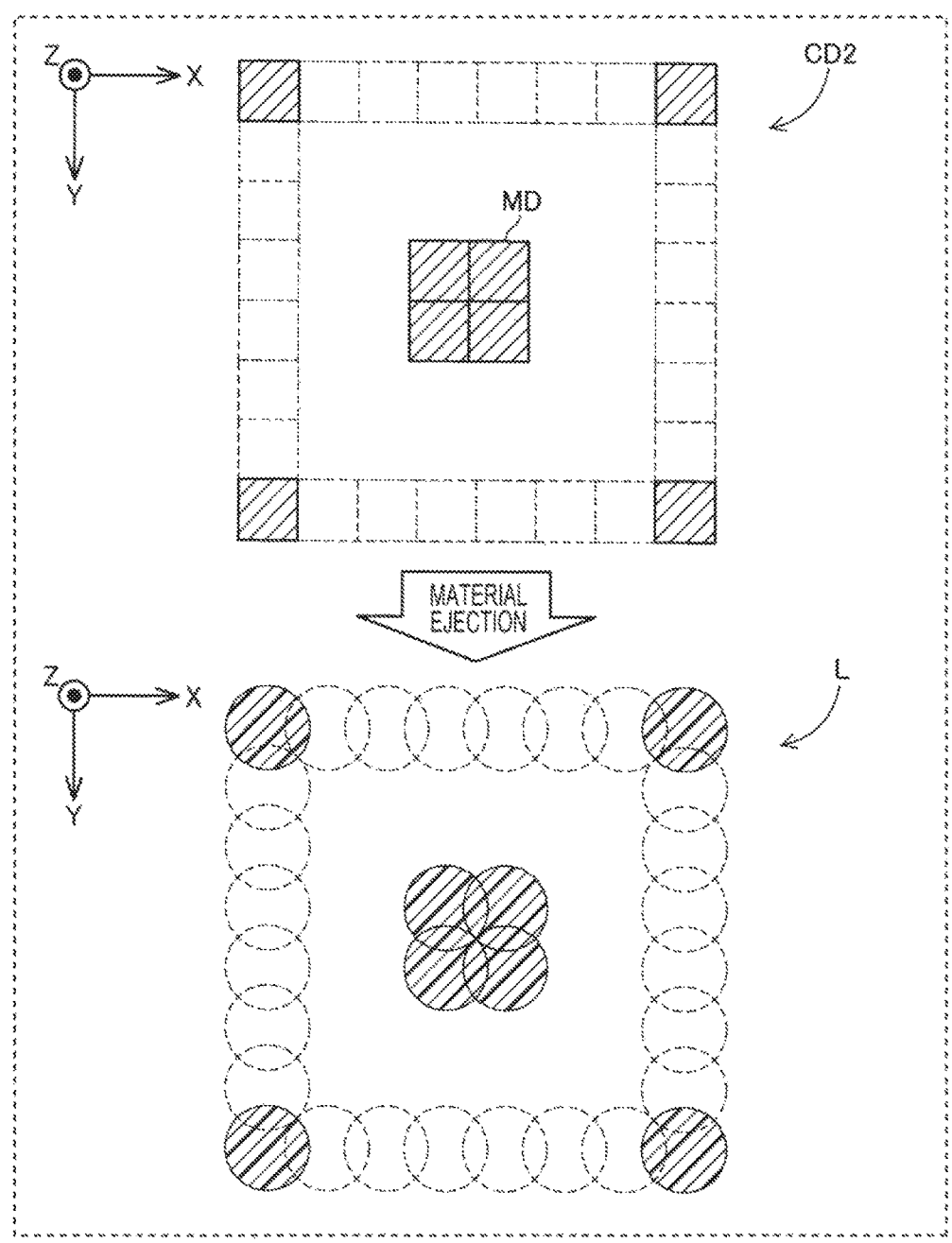
FIG. 8 is a view that shows a modification example of the correction process.

FIG. 8 is a view that shows a modification example of the correction process. In the first embodiment, as shown in FIG. 2, the control portion 50 performs the laminated body formation step and the correction step at different timings. However, a laminated body formation process and a correction process executed in these steps may be performed simultaneously according to a fixed condition. More specifically, a fixed condition is a condition of a portion in which the shape of the cross-section body SB formed on the top of the laminated body LB and the shape of a target correction location of the laminated body LB not coinciding. According to this condition, the control portion 50 may execute a correction process that forms a correction layer CL on the basis of the first correction data CD or the second correction data CD2 simultaneously in a cross-section body formation process for forming a cross-section body SB on the laminated body LB. The term "form simultaneously" refers to simultaneously forming a correction layer in a scan for forming a cross-section body SB. For example, data in which both second correction data CD2 for correcting the apexes, which correspond to protrusions on the upper surface of the laminated body LB, and model data MD of a cross-section body to be laminated on the upper surface of the laminated body LB are included is shown in the upper portion of FIG. 8. As shown by the layer L shown in the lower portion of FIG. 8, since it is possible to simultaneously perform the correction process and formation of a cross-section body if the formation of dots is performed on the basis of such data, it is possible to model an object at high speed. Additionally, in the present modification example, it is possible to model an object at an even higher speed by collectively curing a cross-section body and a correction layer formed simultaneously by using the curing energy application portion 40.

B. Second Embodiment

In the first embodiment, an outline section of an object is made clean by additionally forming a correction layer CL in the outline section of a cross-section body SB. In contrast to this, in the second embodiment, an outline section of an object is made clean by reducing the total amount of the material ejected at, among the outline section of the object, coordinates that configure apexes, which correspond to recesses when the object is viewed in a planar manner. The configuration of the three-dimensional modeling apparatus 100 in the second embodiment is the same as that of the first embodiment.

Figure 9:
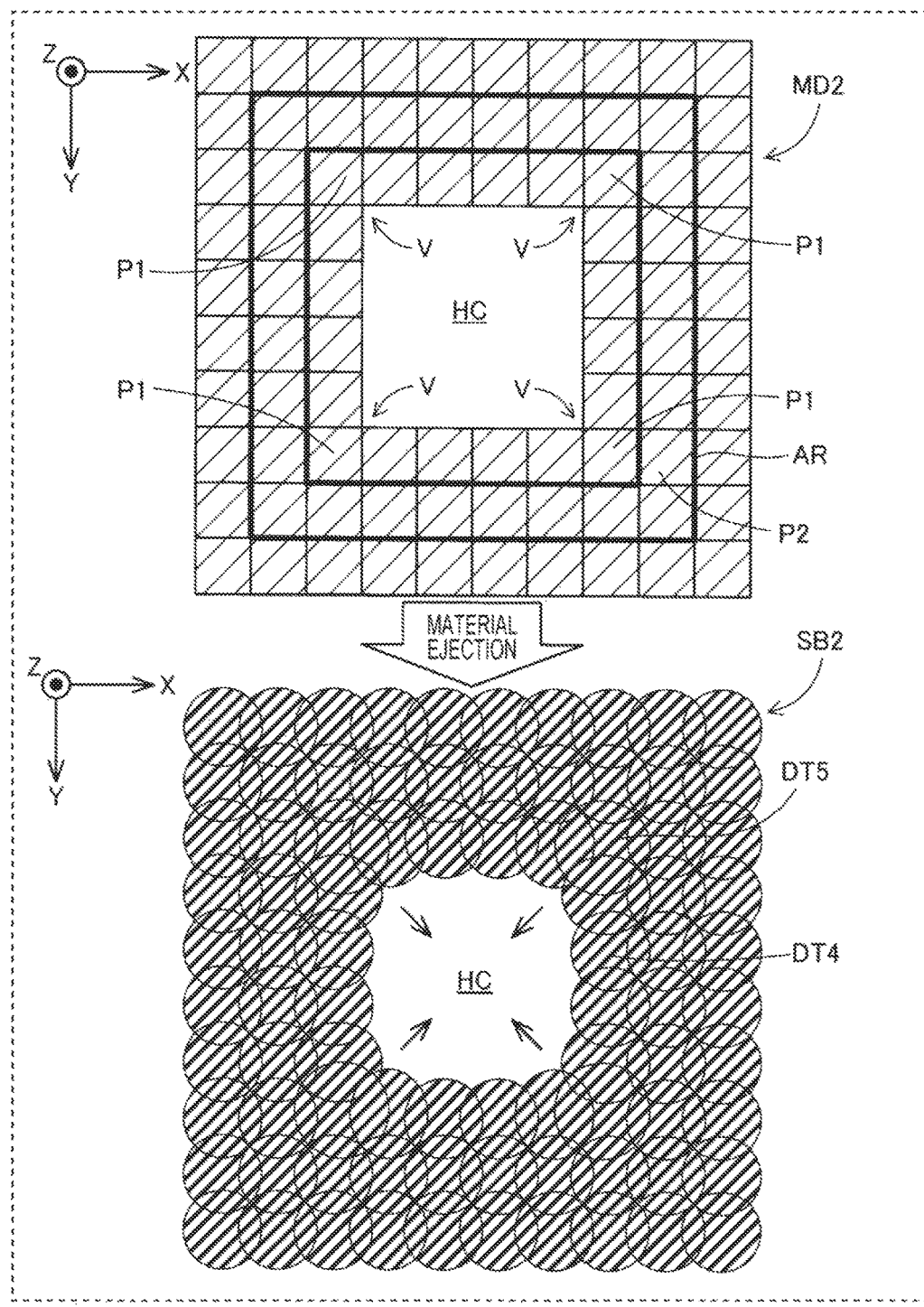
FIG. 9 is a view that shows an example of a cross-section body formed in a second embodiment.

FIG. 9 is a view that shows an example of a cross-section body SB2 formed in the second embodiment. Model data MD2 shown in the upper portion of FIG. 9 has a shape in which a hollow cavity HC is formed in an inner portion. Four apexes V, which correspond to recesses, are formed in the periphery of the hollow cavity HC. The planar shape of the cross-section body SB2 to be formed by the model data MD2 is shown in the lower portion of FIG. 9. As shown in the drawing, the number of dots adjacent to the periphery of a dot DT4 that configures an edge portion of an outline of the hollow cavity HC is different from that of a dot DT5 that configures an apex V, which corresponds to a recess. More specifically, whereas there are five dots adjacent to the dot DT4 that configures an edge portion of the outline of the hollow cavity HC, there are seven dots adjacent to the dot DT5 that configures the apex V, which corresponds to a recess. Therefore, more of the fluid material MT flows into the dot DT5 that configures the apex V than into the dot DT4, and as a result of this, it is likely that wet-spreading of the material into the hollow cavity HC from the dot DT5 will occur. Therefore, when a plurality of cross-section bodies SB2 are laminated, the material remains in the lowest position of the corner portion of the hollow cavity HC, and the modeling accuracy of the section is decreased.

In such an instance, in the present embodiment, the control portion 50 reduces a total amount of the fluid material MT to be ejected at first coordinates P1 (refer to FIG. 9), which configure the apexes V that correspond to recesses, to be lower than a total amount of the fluid material MT to be ejected at a second coordinate P2, which configures a region AR other than an outline section of the planar shape in a case in which an apex V, which corresponds to a recess in a planar shape when the laminated body LB is viewed from above in a planar manner, is present.

Additionally, in the present embodiment, the phrase "coordinates that configure an apex that corresponds to a recess" refers to, among three dots that surround an apex that corresponds to a recess in the cross-section body SB, the coordinates of a dot present on the inner side in an oblique direction of the object from the apex on the XY plane. In addition, the term "apex" refers to an intersection of an edge configured by two or more dots being aligned in the X direction and an edge configured by two or more dots being aligned in the Y direction.

Figure 10:
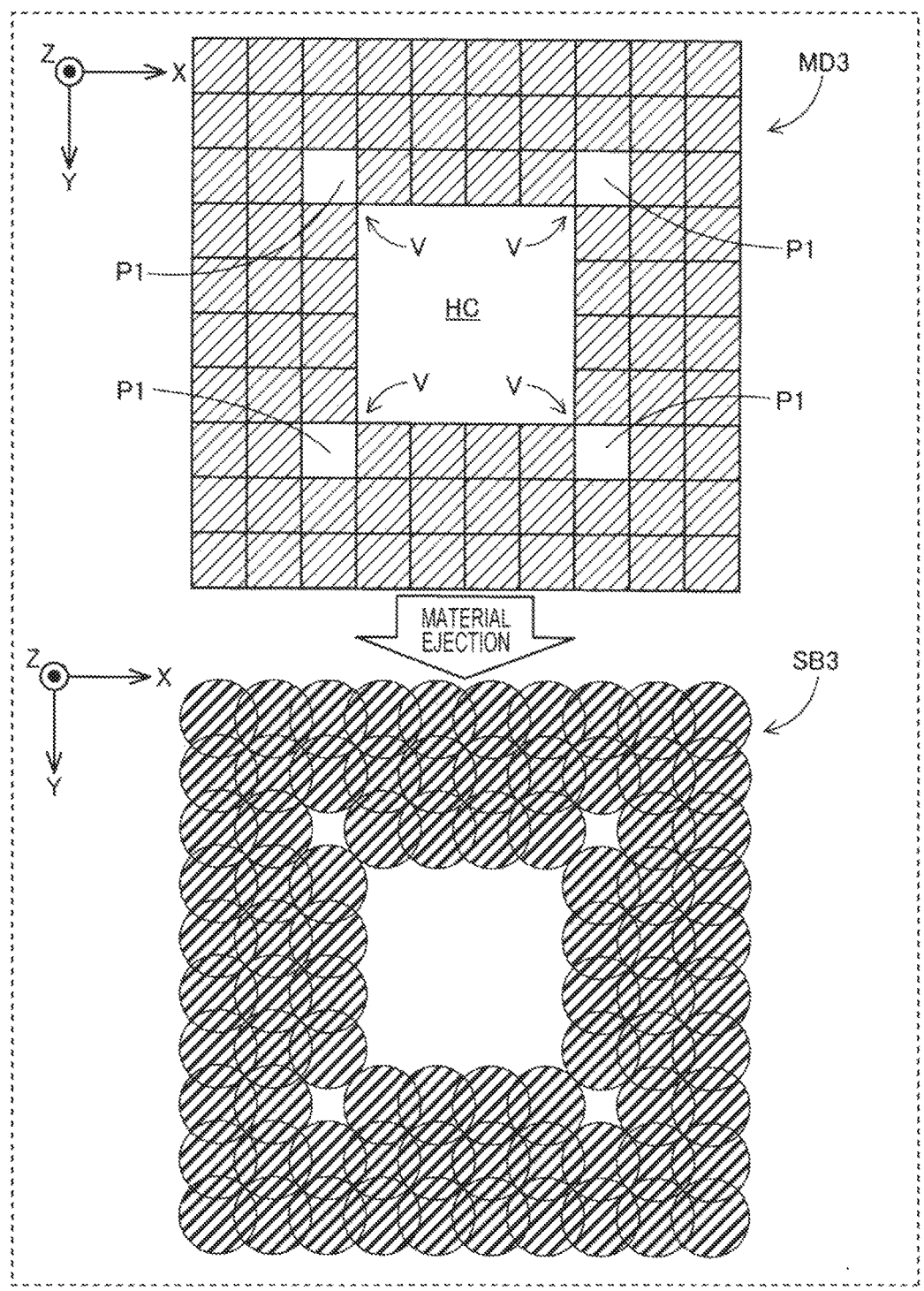
FIG. 10 is an explanatory view of a correction process in the second embodiment.

FIG. 10 is an explanatory view of a correction process in the second embodiment. As shown in the upper portion of FIG. 10, in the present embodiment, the control portion 50 performs a process that sets, among model data MD3 that represents a cross-section body SB, the data of the first coordinates P1, which configure the apexes V that correspond to recesses, to be zero in the correction process of Step S30 of FIG. 2 for a number, which is determined in advance, of the cross-section bodies SB among a plurality of the cross-section bodies SB to be laminated in a subsequent laminated body formation process, and in the manner of the cross-section body SB3 shown in the lower portion of FIG. 10, does not form dots in these sections. According to such a process, the control portion 50 does not eject the material at the first coordinates P1 of one or more cross-section bodies among the cross-section bodies SB that configure a laminated body LB, and as a result of this, it is possible to reduce the total amount of the material ejected at the first coordinates P1 in a modeling target object. Among the laminated body LB, the number of cross-section bodies in which the data of the first coordinates P1 is set to zero can be determined by performing a pre-experiment or a simulation in advance so that it is possible to form the apexes that correspond to recesses in a clean manner by using the correction process of the present embodiment. Additionally, in the three-dimensional modeling process (FIG. 2) of the second embodiment, it is preferable that the correction step of Step S30 be performed before the laminated body formation step of Step S10. As a result of this, it is also possible to perform correction of a laminated body LB initially formed on the modeling stage 20.

According to the second embodiment, which is described above, in a case in which apex sections, which correspond to recesses in a planar shape when the object is viewed from above in a planar manner, are present, it is possible to suppress wet-spreading of the fluid material MT into a space from the apex sections. Therefore, it is possible to form an outline section of an object in a clean manner.

In addition, in the present embodiment, since, rather than laminating a correction layer anew, the total amount of the fluid material to be ejected at coordinates on the inner sides of the apexes V, which correspond to recesses of a cross-section body SB that configures a laminated body LB, is reduced by no ejecting the material at the coordinates, it is possible to make the outline section of the object clean by using a simple process.

Additionally, in the present embodiment, in the correction process, the total amount of the material ejected at the first coordinates is reduced by correcting the model data MD of the cross-section body SB. In contrast to this, the same correction process as the correction process of the second embodiment, which is mentioned above, may also be carried out in advance on the first coordinates in the model data MD acquired from a computer, or the like. In this case, since the correction process is also performed simultaneously as a result of performing the laminated body formation step in FIG. 2, it is possible to omit the correction step of Step S30.

C. Modification Examples

Modification Example 1

Figure 11:
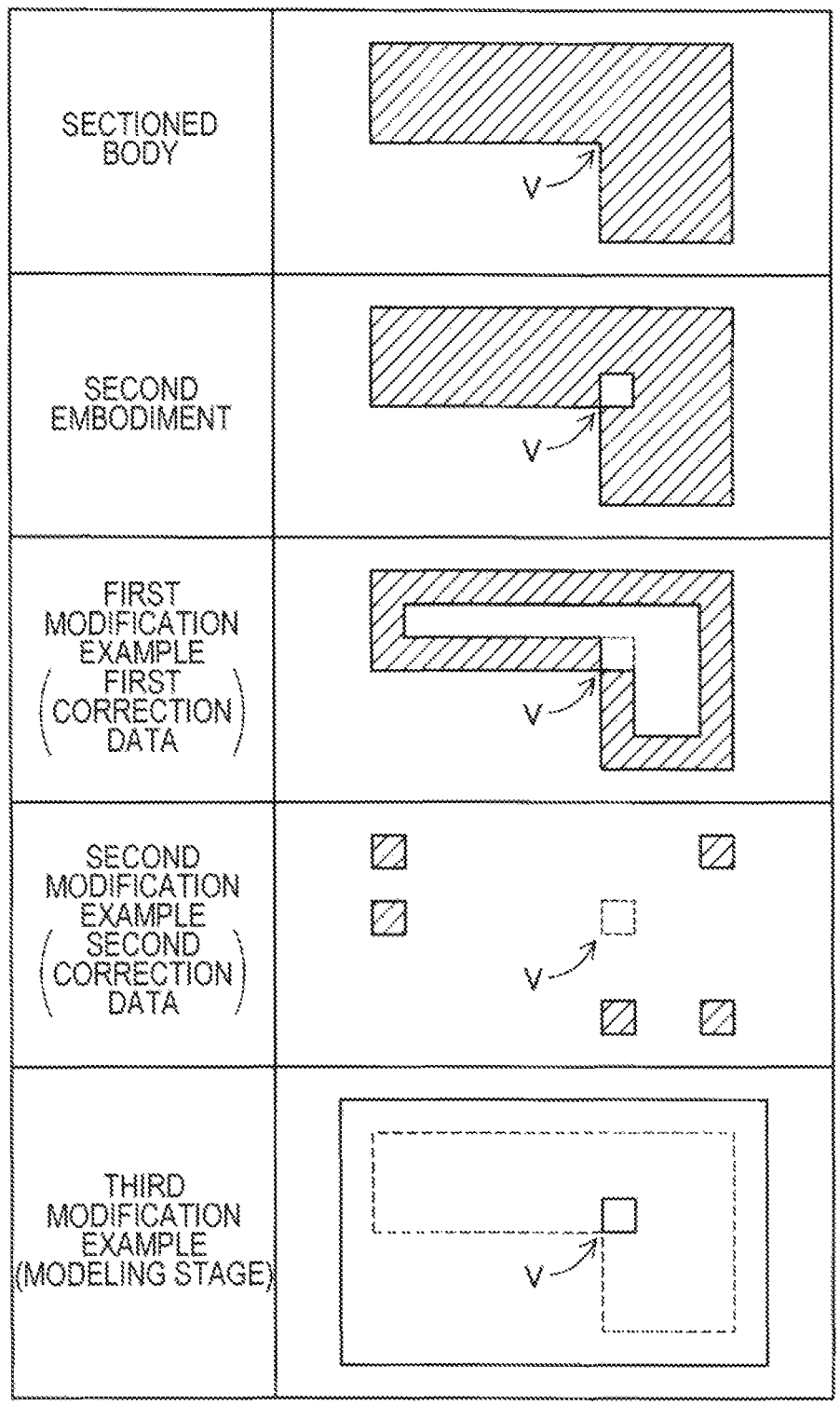
FIG. 11 is a view that shows modification examples of the correction process.

FIG. 11 is a view that shows modification examples of the correction process. The planar shape of an example of a cross-section body is shown in the uppermost portion of FIG. 11. The cross-section body shown in FIG. 11 has an L shape and is provided with an apex V that corresponds to a recess. In the second embodiment, which is mentioned above, correction is performed by setting the data of a coordinate that configures the apex V to zero in the manner of the cross-section body shown in the second portion from the top in FIG. 11. In the above-mentioned embodiment, in place of or in addition to such a correction process, it is possible to perform the same correction process as that of the first embodiment, and for example, in the manner of the shape shown as a first modification example in FIG. 11, reduce the total amount of the material to be ejected at the coordinate that corresponds to the apex V by, among the first correction data for correcting the outline of the object used in the first embodiment, also setting the data of the coordinate that corresponds to the apex V, which corresponds to a recess, to be zero. In addition, in the manner of the shape shown as a second modification example in FIG. 11, it is possible to reduce the total amount of the material to be ejected at the coordinate that corresponds to the apex V by, among the second correction data for correcting apexes of the outline of the object, also setting the data of the coordinate that corresponds to the apex V, which corresponds to a recess, to be zero. In addition, in the manner shown as a third modification example in FIG. 11, it is possible to reduce the total amount of the material to be ejected at the coordinate that corresponds to the apex V of the object by, among the modeling stage 20 on which the object is modeled, also reducing the thickness of a section of a modeled object that corresponds to the apex V, which corresponds to a recess. Additionally, each of the above-mentioned first embodiment, second embodiment, first modification example, second modification example, and third modification example may be arbitrarily combined.

Modification Example 2

In the second embodiment, the first coordinate, which configures an apex that corresponds to a recess in a planar shape when the laminated body LB is viewed in a planar manner, was set as a coordinate present on an oblique inner side of the apex on the XY plane. In contrast to this, the first coordinate, which configures an apex that corresponds to a recess, may be a coordinate that corresponds to any one or more dots among three dots that surround an apex, which corresponds to a recess. In other words, in the second embodiment, among three dots that surround an apex, which corresponds to a recess, the total amount of the material ejected at a coordinate that corresponds to any one or more of the dots may be reduced.

Modification Example 3

In the correction process of the second embodiment, the amount of the material ejected at a coordinate of a cross-section body that corresponds to an apex, which corresponds to a recess, is set to zero. In contrast to this, as long as the ejection amount per one droplet of the fluid material MT can be adjusted, the ejection portion 10 need not necessarily set the amount of the material ejected at a coordinate that corresponds to an apex, which corresponds to a recess, to be zero, and may reduce the amount to be less than a normal amount.

Modification Example 4

In each of the above-mentioned embodiments, the control portion 50 respectively performs modeling of a three-dimensional object using the same ejection portion 10 in the laminated body formation step and the correction step. In contrast to this, the control portion 50 may perform modeling of a three-dimensional object using a different material supply mechanism in the laminated body formation step and the correction step. For example, the laminated body formation step may use the ejection portion 10 of the above-mentioned embodiments, and in the correction step, the supply of the material may be performed by using a head or an ink jet head that supplies the material by using a fused deposition modeling method. In addition, different materials may be used in the laminated body formation step and the correction step.

The invention is not limited to the above-mentioned embodiments and modification examples, and it is possible to realize various configurations within a range that does not depart from the gist thereof. For example, the technical features of the embodiments and modification examples that correspond to technical features of each aspect set forth in the summary columns of the invention may be replaced or combined as appropriate in order to solve a portion of or all of the above-mentioned problems, or in order to achieve a portion of or all of the above-mentioned effects. In addition, with the exception of technical features described as essential features in the present specification, it is possible to remove technical features of the invention as appropriate.

The entire disclosure of Japanese Patent Application No. 2016-184082, filed Sep. 21, 2016 is expressly incorporated by reference herein.

What is claimed is:

1. A three-dimensional modeling apparatus that models a three-dimensional object, the apparatus comprising:
an ejection member configured to selectively elect a fluid material in a dot shape to model the object, the object having a recess therein; and
a controller configured to execute a program so as to:
read model data from an external computer or a recording medium, the model data including cross-section body data and correction data, the cross-section body data corresponding to information of a cross-section body of the object, the correction data corresponding to information of a target correction area of the object that is modeled by using a number of adjacent dots that is smaller than other areas of the object;
form a laminated body in which one layer or more layers of the cross-section bodies are laminated by executing one or more repetitions of a cross-section body formation process, which forms the cross-section body equivalent to one layer of the object by controlling the ejection member and ejecting the fluid material in response to the cross-section body data; and
execute a correction process that prohibits election or ejects the fluid material onto the target correction area which is an outer peripheral corner of the recess in a plan view in response to the correction data, the recess being formed in the laminated body in the cross-section body formation process, the outer peripheral corner corresponding to a first coordinate, wherein, in the correction process, a first total amount of the ejected fluid material at the first coordinate is less than a second total amount of the ejected fluid material at a non-correction area in the other areas, the non-correction area corresponding to a second coordinate different from the first coordinate.

2. The three-dimensional modeling apparatus according to claim 1, wherein in the correction process, the controller is configured to prohibit elect or eject the fluid material of the first total amount onto the tar et correction area in the one layer or the more layers of the cross-section bodies of the laminated body.

3. The three-dimensional modeling apparatus according to claim 1, wherein the target correction area is located directly adjacent to an inner peripheral or an outer peripheral of the laminated body in the plan view.

4. The three-dimensional modeling apparatus according to claim 1, further comprising:

a pedestal on which the laminated body is formed, a first height from the pedestal to a top of the laminated body at the first coordinate is less than a second height from the pedestal to the top of the laminated body at the second coordinate.

\* \* \* \* \*